(12) United States Patent
Lipton et al.

(10) Patent No.: US 9,142,151 B2
(45) Date of Patent: Sep. 22, 2015

(54) ROBOTIC SMART SIGN SYSTEM AND METHODS

(71) Applicant: Points Lab Co., Brooklyn, NY (US)

(72) Inventors: Michael William Lipton, Brooklyn, NY (US); Mattias Hans Gunneras, Brooklyn, NH (US); Andrew Stephen Zolty, Brooklyn, NY (US)

(73) Assignee: POINTS LAB CO., Brooklyn, NY (US)

( * ) Notice: Subject to any disclaimer, the term of this patent is extended or adjusted under 35 U.S.C. 154(b) by 1 day.

(21) Appl. No.: 14/295,198

(22) Filed: Jun. 3, 2014

(65) Prior Publication Data

US 2014/0358281 A1   Dec. 4, 2014

Related U.S. Application Data

(60) Provisional application No. 61/830,609, filed on Jun. 3, 2013.

(51) Int. Cl.
*G09F 15/00* (2006.01)
*G09F 11/02* (2006.01)
(Continued)

(52) U.S. Cl.
CPC ............ *G09F 11/02* (2013.01); *G06Q 30/0269* (2013.01); *G09F 13/00* (2013.01); *G09F 27/00* (2013.01); *G09F 9/30* (2013.01); *G09F 15/0037* (2013.01); *G09F 27/005* (2013.01); *G09F 2007/1878* (2013.01); *G09F 2027/001* (2013.01); *Y10S 901/02* (2013.01)

(58) Field of Classification Search
CPC ......... G09F 11/02; G09F 13/00; G09F 27/00; G09F 15/0037; G09F 27/05; G09F 2007/1878; G09F 2027/001
See application file for complete search history.

(56) References Cited

U.S. PATENT DOCUMENTS

| 3,273,271 A | 9/1966 | Werner |
| 3,935,655 A | 2/1976 | Fritzinger |

(Continued)

FOREIGN PATENT DOCUMENTS

| EP | 1050036 A2 | 11/2000 |
| EP | 1496489 B1 | 9/2008 |

(Continued)

OTHER PUBLICATIONS

Igirouette web page; URL:<http://igirouette.fr/> dated 2012; page accessed Nov. 13, 2014.

(Continued)

*Primary Examiner* — Gary Hoge
(74) *Attorney, Agent, or Firm* — Wilson Sonsini Goodrich & Rosati

(57) ABSTRACT

Described are robotic signs comprising: a sign post; an arm movably attached to the sign post, the arm having a positioning apparatus configured to allow the arm to rotate independently and contiguously around the sign post, the arm having at least one face comprising an electronic display configured to present display items; and a communication element configured to receive display item information from a remote administration application, the display item information comprising a direction and a description; wherein upon presenting a display item, an arm rotates to indicate the direction and displays the description. Also described are software applications for configuring the robotic signs, networks of the robotic signs, and advertising systems utilizing the robotic signs.

31 Claims, 12 Drawing Sheets

(51) Int. Cl.
   *G09F 13/00*   (2006.01)
   *G06Q 30/02*   (2012.01)
   *G09F 27/00*   (2006.01)
   *G09F 9/30*   (2006.01)
   *G09F 7/18*   (2006.01)

(56) References Cited

U.S. PATENT DOCUMENTS

| | | |
|---|---|---|
| 4,342,168 A | 8/1982 | Schmanski |
| D276,736 S | 12/1984 | Maya et al. |
| 4,837,569 A | 6/1989 | Sproul, Sr. |
| 5,054,219 A | 10/1991 | Hoyt et al. |
| 5,990,802 A | 11/1999 | Maskeny |
| 7,167,106 B2 | 1/2007 | Haase |
| 2004/0200105 A1 | 10/2004 | Ng |
| 2006/0202952 A1* | 9/2006 | Sato et al. .................. 345/156 |
| 2009/0076718 A9 | 3/2009 | Cody |
| 2010/0102989 A1 | 4/2010 | Lee |
| 2010/0182164 A1 | 7/2010 | Diba |
| 2011/0078934 A1* | 4/2011 | McDougall et al. ............ 40/447 |
| 2011/0185607 A1* | 8/2011 | Forster et al. ................... 40/452 |
| 2011/0239500 A1* | 10/2011 | Gatuslao ......................... 40/473 |
| 2014/0358685 A1* | 12/2014 | Want et al. .................. 705/14.58 |

FOREIGN PATENT DOCUMENTS

| | | |
|---|---|---|
| JP | 2001/290436 | 10/2001 |
| KR | 10-0888640 B1 | 3/2009 |
| WO | WO 9939319 A2 | 5/1999 |
| WO | WO 2005010853 A1 | 2/2005 |
| WO | WO 2008/146257 A1 | 12/2008 |
| WO | WO 2011065615 | 6/2011 |

OTHER PUBLICATIONS

PCT/US2014/040751 International Search Report and Written Opinion dated Oct. 27, 2014.

* cited by examiner

A

B

C

A

B

ROBOTIC SMART SIGN SYSTEM AND METHODS

CROSS-REFERENCE TO RELATED APPLICATIONS

This application claims the benefit of U.S. Application Ser. No. 61/830,609, filed Jun. 3, 2013, which is incorporated by reference in its entirety.

BACKGROUND OF THE INVENTION

Directional signs include those used primarily to give information about the location of either the viewer or possible destinations, and are considered a subset of the informative signs group.

SUMMARY OF THE INVENTION

The inventions of the present disclosure include a smart sign, and associated systems and methods. In an embodiment, the smart sign comprises an internet-connected robotic sign platform comprising at least one sign post. Coupled to the sign post is at least one, but preferably a plurality of sign arms capable of rotating about the sign post. Each arm further comprises at least one display face for the display of dynamic content. The displayed dynamic content may be related to the direction the sign arm is pointing. The smart sign may further comprise a user interface whereby users can interact with the sign. The smart sign may be coupled to a back end subsystem allowing for the configuration of the smart sign, as in, for example by linking the smart sign to a database.

In another embodiment the invention is a method for providing geographically related information to a user, comprising the steps of providing a smart sign capable of dynamically displaying information and indicating directional cues relating to the displayed information, such as, for example, by pointing towards a location; providing event data for the smart sign including location data associated with each event datum; and allowing the sign to display event data and indicate the location of the event datum, by pointing towards its location, and the like. The system may further comprise the steps of accepting a user-generated query and displaying data responsive to the query.

In one aspect, disclosed herein are robotic signs comprising: a sign post; an arm movably attached to the sign post, the arm having a positioning apparatus configured to allow the arm to rotate independently and contiguously around the sign post, the arm having at least one face comprising an electronic display configured to present display items; and a communication element configured to receive display item information from a remote administration application, the display item information comprising a direction and a description; wherein upon presenting a display item, an arm rotates to indicate the direction and displays the description. In some embodiments, the sign post is a vertical post for mounting on a horizontal surface. In other embodiments, the sign post is a horizontal post for mounting on a vertical surface. In some embodiments, the display is a color display. In further embodiments, the display is selected from: a matrix of light emitting diodes, a light emitting diode backlit thin-film transistor display, a liquid crystal display, a organic light-emitting diode display, an active matrix organic light emitting diode display, and a combination thereof. In some embodiments, the sign comprises about 1 to about 10 arms. In various embodiments, the sign comprises 1, 2, 3, 4, 5, 6, 7, 8, 9, 10, or more arms. In a particular embodiment, the sign comprises 3 arms. In some embodiments, the arm is reversibly attached to the sign post. In some embodiments, the arm has a brake apparatus configured to arrest rotation of the arm. In various embodiments, the positioning apparatus comprises: a stepper motor, a DC motor, or a DC servo motor. In a particular embodiment, the positioning apparatus comprises a stepper motor. In some embodiments, the display item information further comprises one or more of: a distance, a location, a graphic icon, and an animation. In some embodiments, the description comprises one or more of: a venue, a name, a location, a date, a time, a wait time, transit information, and public facility information. In some embodiments, the description comprises one or more of: a price, a discount, a coupon code, an offer, and an advertisement. In some embodiments, the description comprises one or more of: a news headline, a stock quote, a sports score, a weather report, a review, a rating, a social media post, a microblog post, media posted to a social photo-sharing service, and media posted to a social video-sharing service. In some embodiments, the direction comprises one or more rotational movements. In some embodiments, the sign further comprises a consumer user interface panel configured to allow selection of display items. In some embodiments, the sign further comprises an environmental sensor. In further embodiments, the environmental sensor is selected from: a camera, a temperature sensor, a humidity sensor, a wind speed sensor, a wind direction sensor, an ambient light sensor, and a combination thereof. In some embodiments, the communication element is a wireless communication element. In further embodiments, the communication element is configured to receive display item information from a consumer mobile application. In some embodiments, the sign further comprises an imaging element to uniquely identify consumers near the sign based on captured images. In some embodiments, the sign further comprises a wireless communication element to uniquely identify consumers near the sign based on unique wireless signals from devices associated with the consumers. In further embodiments, the display is changed in response to identification of a consumer near the sign.

In another aspect, disclosed herein are robotic sign networks comprising a plurality of robotic signs, wherein each sign comprises: a sign post; an arm movably attached to the sign post, the arm having a positioning apparatus configured to allow the arm to rotate independently and contiguously around the sign post, the arm having at least one face comprising an electronic display configured to present display items; and a communication element configured to receive display item information from a remote administration application, the display item information comprising a direction and a description; wherein upon presenting a display item, the arm rotates to indicate the direction or the location of another robotic sign in the network and displays the description. In various embodiments, the robotic sign networks include about 5, 10, 20, 30, 40, 50, 60, 70, 80, 90, 100, 200, 300, 400, 500, 600, 700, 800, 900, 1000 or more robotic signs.

In another aspect, disclosed herein are computer-implemented systems comprising: a digital processing device comprising an operating system configured to perform executable instructions and a memory; a computer program including instructions executable by the digital processing device to create an administrative application comprising: a software module configured to present an interface allowing an administrative user to configure display items for one or more robotic signs, each display item comprising a location and description; wherein each display item is presented on a display on a rotating arm of a robotic sign, the arm rotating to indicate the direction of the location and displaying the description; and a software module configured to present analytics data pertaining to the presentation of the display items by the one or more robotic signs. In some embodiments, the display item further comprises one or more of: a distance, a graphic icon, and an animation, a venue, a name, a location, a date, a time, a wait time, transit information, public facility information, a price, a discount, a coupon code, an offer, an advertisement, a news headline, a stock quote, a sports score, a weather report, a review, a rating, a social media post, a microblog post, media posted to a social photo-sharing service, and media posted to a social video-sharing service. In some embodiments, the application further comprises a software module configured to present an interface allowing the administrative user to view a calendar-based schedule of display items. In some embodiments, the software module configured to present an interface allowing an administrative user to configure display items provides a preview of the display item presented on a robotic sign.

In another aspect, disclosed herein are advertising systems comprising: a robotic sign comprising: a sign post; an arm movably attached to the sign post, the arm having a positioning apparatus configured to allow the arm to rotate independently and contiguously around the sign post, the arm having at least one face comprising an electronic display configured to present display items; and a wireless communication element configured to: detect a unique wireless signal from a device associated with a consumer near the sign; and receive display item information from a remote administration application, the display item information comprising: a location and an advertisement; wherein upon presenting a display item, an arm rotates to indicate the direction of the location and displays the advertisement; a digital processing device provided with instructions executable by the digital processing device to create an administrative application comprising: a software module configured to present an interface allowing an administrative user to remotely configure display items for the robotic sign; and a software module configured to present analytics data pertaining to the presentation of the display items by the robotic sign and consumer conversion data; and a conversion tracking device located near the subject of the advertisement at the location, the device configured to detect the unique wireless signal and report consumer conversion information to the administrative application. In some embodiments, the system comprises a plurality of robotic signs and a plurality of conversion tracking devices.

In another aspect, disclosed herein are systems comprising: a robotic sign comprising: a sign post; an arm movably attached to the sign post, the arm having a positioning apparatus configured to allow the arm to rotate independently and contiguously around the sign post, the arm having at least one face comprising an electronic display configured to present display items; and a wireless communication element configured to: detect a unique wireless signal from a device associated with a consumer near the sign; and receive display item information from a remote administration application, the display item information comprising: a location and a description; wherein upon presenting a display item, an arm rotates to indicate the direction of the location and displays the description; a digital processing device provided with instructions executable by the digital processing device to create an administrative application comprising: a software module configured to present an interface allowing an administrative user to remotely configure display items for the robotic sign; and a software module configured to present analytics data pertaining to the presentation of the display items by the robotic sign and consumer tracking data; and a tracking device located near the subject of the advertisement at the location, the device configured to uniquely identify consumers and report consumer tracking information to the administrative application. In some embodiments, the system comprises a plurality of robotic signs and a plurality of tracking devices.

DETAILED DESCRIPTION OF THE INVENTION

Figure 1:
FIG. 1 shows a non-limiting example of a robotic sign described herein.

Described herein, in certain embodiments, are robotic signs comprising: a sign post; an arm movably attached to the sign post, the arm having a positioning apparatus configured to allow the arm to rotate independently and contiguously around the sign post, the arm having at least one face comprising an electronic display configured to present display items; and a communication element configured to receive display item information from a remote administration application, the display item information comprising a direction and a description; wherein upon presenting a display item, an arm rotates to indicate the direction and displays the description.

Also described herein, in certain embodiments, are robotic sign networks comprising a plurality of robotic signs, wherein each sign comprises: a sign post; an arm movably attached to the sign post, the arm having a positioning apparatus configured to allow the arm to rotate independently and contiguously around the sign post, the arm having at least one face comprising an electronic display configured to present display items; and a communication element configured to receive display item information from a remote administration application, the display item information comprising a direction and a description; wherein upon presenting a display item, the arm rotates to indicate the direction or the location of another robotic sign in the network and displays the description.

Also described herein, in certain embodiments, are computer-implemented systems comprising: a digital processing device comprising an operating system configured to perform executable instructions and a memory; a computer program including instructions executable by the digital processing device to create an administrative application comprising: a software module configured to present an interface allowing an administrative user to configure display items for one or more robotic signs, each display item comprising a location and description; wherein each display item is presented on a display on a rotating arm of a robotic sign, the arm rotating to indicate the direction of the location and displaying the description; and a software module configured to present analytics data pertaining to the presentation of the display items by the one or more robotic signs.

Also described herein, in certain embodiments, are advertising systems comprising: a robotic sign comprising: a sign post; an arm movably attached to the sign post, the arm having a positioning apparatus configured to allow the arm to rotate independently and contiguously around the sign post, the arm having at least one face comprising an electronic display configured to present display items; and a wireless communication element configured to: detect a unique wireless signal from a device associated with a consumer near the sign; and receive display item information from a remote administration application, the display item information comprising: a location and an advertisement; wherein upon presenting a display item, an arm rotates to indicate the direction of the location and displays the advertisement; a digital processing device provided with instructions executable by the digital processing device to create an administrative application comprising: a software module configured to present an interface allowing an administrative user to remotely configure display items for the robotic sign; and a software module configured to present analytics data pertaining to the presentation of the display items by the robotic sign and consumer conversion data; and a conversion tracking device located near the subject of the advertisement at the location, the device configured to detect the unique wireless signal and report consumer conversion information to the administrative application.

Also described herein, in certain embodiments, are systems comprising: a robotic sign comprising: a sign post; an arm movably attached to the sign post, the arm having a positioning apparatus configured to allow the arm to rotate independently and contiguously around the sign post, the arm having at least one face comprising an electronic display configured to present display items; and a wireless communication element configured to: detect a unique wireless signal from a device associated with a consumer near the sign; and receive display item information from a remote administration application, the display item information comprising: a location and a description; wherein upon presenting a display item, an arm rotates to indicate the direction of the location and displays the description; a digital processing device provided with instructions executable by the digital processing device to create an administrative application comprising: a software module configured to present an interface allowing an administrative user to remotely configure display items for the robotic sign; and a software module configured to present analytics data pertaining to the presentation of the display items by the robotic sign and consumer tracking data; and a tracking device located near the subject of the advertisement at the location, the device configured to uniquely identify consumers and report consumer tracking information to the administrative application.

CERTAIN DEFINITIONS

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Robotic Sign

In one embodiment, a robotic sign described herein comprises a sign post, a user interface, one or more sign arms, sign faces, a back end subsystem, and associated software.

Referring to FIG. 1, in a particular embodiment, a robotic sign includes an elongated sign post onto which three sign arms are attached. The sign arms are movably attached to the sign post such that each is independently able to rotate contiguously about the sign post. Further, in this embodiment, the robotic sign includes a decorative base for mounting the sign to a horizontal surface and a user interface panel that displays a graphic user interface for interacting with the sign.

Figure 2:
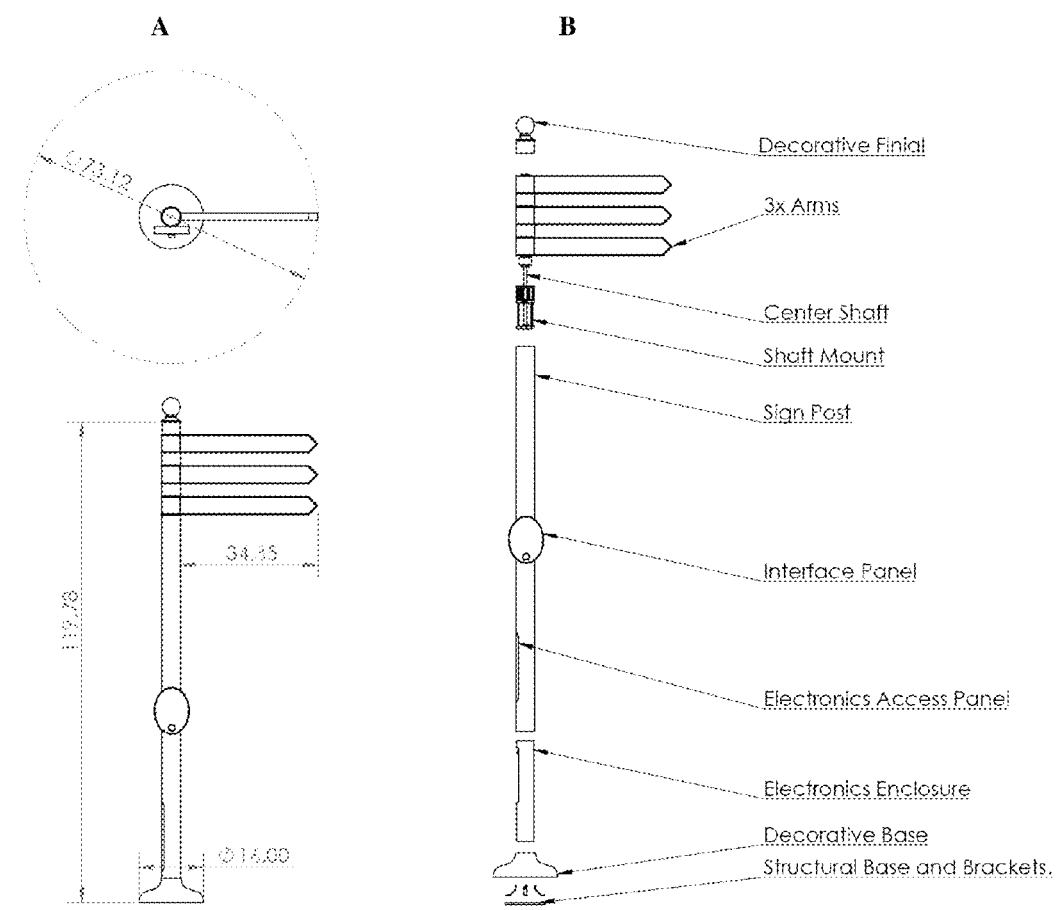
FIG. 2 shows a non-limiting example of a structural diagram of a robotic sign.

FIG. 2(a) shows the dimensions of a particular non-limiting robotic sign and a working zone of the sign. Referring to FIG. 2(b), in a particular embodiment, the sign post comprises the following components: decorative finial, three arms, center shaft, shaft mount, sign post main body, interface panel, electronic access panel, electronics enclosure, decorative base, structural base, and bracket. In various embodiments, the robotic sign comprises only a portion of the list of components. For example, in certain embodiments, only one or two arms are included.

Sign Post

In some embodiments, a robotic sign comprises an elongated sign post onto which one or more robotic arms are movably attached. In further embodiments, a robotic sign comprises an elongated sign post that optionally breaks down into two or more smaller, reversibly connectable pieces for easy transport, storage, and/or installation. In further embodiments, the sign post comprises an end which includes adaptations for fixation to a surface. In some embodiments, the sign post is a vertical sign post for attachment to a horizontal surface such as the ground or a base structure. In other embodiments, the sign post is a horizontal sign post for attachment to a vertical surface such as the side of a building. For example, the bottom end of the sign post is optionally cemented into the ground or bolted or welded to a base structure, such as a plate. In some embodiments, the base structure is optionally adapted for increased mobility such as by placing it on wheels or castors or the like.

Sign Arms

In some embodiments, a robotic sign comprises one or more sign arms. In further embodiments, the sign arms are adapted and coupled to the sign post such that they can move in order to point in different directions and towards various locations. The movement of the arms about the sign post may be accomplished via any mechanism known to those having skill in the art. For example, the movement of the arms may be performed by an electrical motor embedded inside the sign arm. The sign arms are capable of full 360 degree rotational freedom for continuous uninterrupted rotation. This rotational freedom may be accomplished by using slip rings to avoid tangling in the power and data wiring. The sign arms may move on the Y-axis (up & down) by incorporating an extender on the arm, such as, for example at the end of the arm.

In various embodiments, the sign arms have the ability to move independently and at different speeds.

In some embodiments, internal sensors in the sign arms are used to calibrate the position of the arms. Calibration may occur as the system comes on-line, or at the occurrence of any other condition wherein a calibration is necessary or desirable. In some embodiments, the robotic sign system will be able to determine its exact location by using GPS coordinates, magnetometers, or any other location determination system known to those skilled in the art, and through such systems, know where it is and where each of its constituent arms is pointing regardless of where it is installed. In some embodiments, a closed loop feedback system using an encoder is used for real time positional information of each arm and thereby keeps track of which way each arm is pointing.

In some embodiments, when wind speeds exceed a predetermined threshold, the sign arms may move to face the opposite direction from the source of the wind. This is a safety protocol that will override other behavior of the sign in order to minimize the risk of the sign arms sustaining damage in heavy wind. In further embodiments, the sign arms may disengage from the gear box in the event that some other external force is applied. For example, in the event that a person forcibly moves an arm, the arm may disengage from the gear box in order to prevent damage to the mechanism.

The sign arms and interface may be detachably coupled to the sign post such that they can be easily removed for storage and or transportation of the system.

Figure 3:
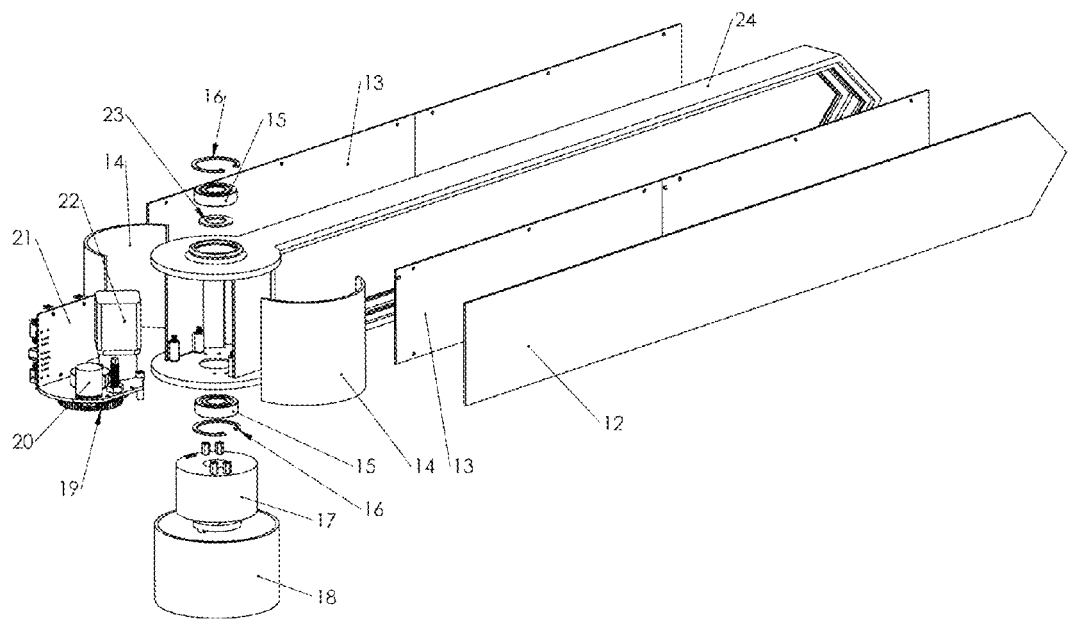
FIG. 3 shows a non-limiting example of an exploded structural diagram of a sign arm.

Referring to FIG. 3, in some embodiments, a sign arm described herein comprises tinted or transparent glass or plastic 12, a display segment 13, a cuff/access panel 14, a ball bearing 15, a bearing retainer 16, a slip-ring 17, a protective cover/post segment 18, gears 19, an encoder 20, a uC/motor controller 21, a motor 22, a thrust bearing 23, and an arm chassis 24.

Sign Arm Positioning System

In some embodiments, inside the sign arm there is a motor controller board. In further embodiments, the motor controller board runs a software program that takes instructions over a RS485 bus from the main client program running inside the interface panel, and performs the necessary functions to control the direction and speed of the motor and take positional feedback from the in arm sensors. In some embodiments, a display item comprises display item information that includes a location or a direction in which to position the sign arm. In further embodiments, the sign arm is positioned via a series of movements that form an animation such as a series of rotations or partial rotations.

The sign arm positioning feedback system optionally comprises one or more sensors (described further herein). Using the positional feedback from these sensors, the controller can accurately determine the direction the arm is pointing. By setting the power output and direction of the motor, the controller can move the arm to a new location. As the arm is moving the controller is constantly monitoring the feedback sensors for the arm's new location. As the distance between the current location and the target location decreases, the controller knows that the arm is getting closer to the target and therefore it starts slowing down the speed of the motor and the arm comes to a rest or brake when the new target location is hit.

Sensor 1: Magnetometer

In some embodiments, the controller connected to a magnetometer which may be located in any suitable location, such as located at the tip of the sign arm. The magnetometer gives the controller a compass reading as reference to where it's pointing. This way the sign can get installed very quickly in a location without the need for a manual calibration. When the sign is installed using manual calibration, all sign arms are manually moved to a known compass location (e.g., North) and the controller program is given the instruction that it calibrated to start from this known position.

Sensor 2: Magnetic Reed Switch

In some embodiments, the sign arm has a static part which is coupled to the main center shaft. This static part may comprise of a set of gears and a small magnet. Since the magnet does not rotate with the arm, a magnetic sensor (reed switch) triggers a reading every time the arm passes by this magnet. This way there is a fixed reference point to where the arm is pointing. When calibrated, the arm (using either manual calibration or a magnetometer) the system monitors the number of encoder pulses the current location is in a clockwise movement from the last time the reed switch was triggered.

Sensor 3: Rotary Encoder

In some embodiments, a rotary quadrature encoder gives constant, real-time feedback to the controller based on the relative position of the arm. The encoder also gives back information on which direction the arm is moving. This is helpful should any external force act upon the arm while in operation, in either direction, the controller will still be aware of the position of the arm.

Addressing Each Arm

In some embodiments, the signs, systems, networks, and methods described herein include a mechanism for addressing each arm. In some embodiments, software sends specific commands to each arm, and an addressing scheme is built into each arm. In further embodiments, a mechanical DIP switch allows the operator to define a unique address for each arm on a sign installation.

Picking a Motor

When selecting a motor for robotic sign arms, it is important to consider the size and torque to speed ratio. In a particular embodiment, a robotic sign system uses a 1.8 degree per step stepper motor, NEMA 17 sized frame. Suitable motors include those with at least 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 degrees per step. Suitable stepper motors include those having one of the following common step angles: 0.36°, 0.72°, 0.9°, 1.8°, 3.75°, or 7.5°. The stepper motors small step angle and relatively high torque to speed ratio, allows us to drive the arms at a reasonable speed, with adequate torque in mild weather or indoor applications, without needing to add too much gearing.

A general rule of thumb for the requirements of the motor is that it can move the arm from standstill to full speed in about 1.5 to 3 seconds of acceleration time, or at least 0.1, 0.2, 0.3, 0.4, 0.5, 0.6, 0.7, 0.8, 0.9, 1, 2, 3, 4, 5, 6, 7, 8, 9, or 10 seconds of acceleration time. And the full speed of the arm should be around 0.2 RPM (5 seconds for one revolution). Depending on the size, weight and inertia of the arm, and also depending on the external forces such as wind load, the power of the motor would need to be adjusted.

In some embodiments, operating duty cycle and heat concerns need to be factored in to the decision of the motor. In certain embodiments in an outdoor operation under hot and humid climate, a motor with high thermal operation rating and high IP/NEMA ratings is a necessity.

In some applications, the system includes one or more brushed or brushless AC or DC motor, or one or more AC induction motors.

In some applications, the system includes one or more DC Servo motors. In some situations, this type of motor needs more care to be placed in the gearing for the sign since the servo motor typically operates at higher speeds than a stepper motor.

Braking

In some embodiments, the signs, systems, networks, and methods described herein include a mechanism adapted to brake each arm. In order to make sure that the sign arms work in windy conditions, each sign arm should be fitted with a braking mechanism. Non-limiting examples include an electromagnetic brake. In various embodiments when a motor with hold functionality like a stepper motor is used, then it is used to hold the sign arm in place.

Sign Faces

Each sign arm comprises one or more faces. In some embodiments, one or more display screens are attached to a sign arm face. In a particular embodiment, a sign arm comprises two faces, each with a display screen for displaying information such as text, graphical, or video content. The screens optionally use any technology capable of displaying visual information now known or later invented, such as, for example, LED, LCD, plasma or the like. The sign faces may display location information and iconography for locations at which the sign arms are pointing. When more than one sign arm is pointing toward the same location, the sign faces may be used to form a larger display surface allowing the system to render more information to a user. See, e.g., FIG. 9B.

Display and Optics

In some embodiments, the devices, systems, networks, and methods described herein include robotic signs, or use of the same. In some embodiments, each sign arm has 2 sides of screens. In certain embodiments, these signs are controlled by a micro controller in each arm. A command is sent from the master controller in the bottom of the sign which is interpreted by the micro controller which subsequently draws the content to the screens. A raw frame buffer data could also be sent through from the master controller directly to the screens to be rendered, effectively bypassing the controller for the rendering. Depending on the specifics on the screen resolution, number of arm and internal data bandwidth in the sign, rendering the content in each arm as opposed to in the master controller may be the only option. Depending on the specific installation requirements, the screens could be made up of any display technology such as individual LEDs (including RGB/Colored LEDs) in a matrix, LED backlit TFT, LCD, e-ink-like displays, etc. For outdoor applications, a sufficiently bright screen with high contrast is necessary. Using high brightness discreet LED in a matrix is a good choice, other outdoor/sunlight readable displays such as transflective displays are favorable. Passive display technology could be used such as e-ink or similar. This would also have the side effect of low power usage and the potential for operation with solar panels.

The dimensions of an LED array are customized. In some embodiments, each axis of a LED array includes at least 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 110, 120, 130, 140, 150, 160, 170, 180, 190, 200, or 300 LEDs. In one embodiment, a display comprises a 16×176 LED array which displays custom fonts, icons, etc. In another embodiment, a display comprises a 32×192 LED array which displays custom fonts, icons, etc.

Furthermore to enhance the optics of the display, especially when using discrete LEDs, some embodiments cover the LEDs with a dark tinted glass or plastic, in order to get the contrast up. In certain embodiments, since darker material usually get's the contrast to go up, but at the same time reduces the overall brightness of the display. In some embodiments, 12%-30% of all light is the best pairing with the discrete LEDs.

In some embodiments, the optical screen in front of the sign is formed into little lenses for each pixel in order to enhance the appearance of each pixel. By molding/machining or other way of fabrication, we can put a special lens in front of each pixel, this would help us do 2 things, 1: focus the emitted light forwards and downwards to optimize the overall observed brightness of the screens, 2: make each pixel appear larger and closer to its neighboring pixels.

Interface

In some embodiments, the signs, systems, networks, and methods described herein include an interface. The interface may be any user interface known to those skilled in the art such as a panel with an input mechanism. In some embodiments, the interface is a screen that displays a map of the location in which the system is placed. The interface panel has input options for a user to select options and navigate through information. In some embodiments, the interface is coupled to the system in any convenient way, as in, for example by mounting it onto the sign post located at a convenient height for users. The interface may have a graphical user interface to display menu options and/or other information to users and/or buttons and/or a touch screen, or some other combination known to those skilled in the art in order to allow users to select from menu options. The menu options provided may enable users to request data relating to various categories of information such as, but not limited to, food, shopping, transportation, services, special events and the like. The system may include functionality to send directions or other information collected from the system to users, such as, for example by sending the information to users' wireless devices such as smart phones, smart watches and the like.

Various options may be available to users and are limited only by the imagination. Options may be static, or they may change. Options may change manually by administrative input, or may change automatically, as in, for example:

any event that can be programmatically detected;
any event that can be manually detected and entered into the central database;
by time of day or week;
specific calendar events or holidays;
data taken from sensors coupled to the system; and
APIs for web-enabled data services.

The various options on this list, as well as other options that will be readily apparent to those skilled in the art, can dictate which menu options appear, but can also cause the content of the sign faces to change for a given menu option.

In addition to a touch-based interface, users may interact with the system through any other interaction methods currently known to those skilled in the art or later invented. For example, the system may detect a user's heart beat/heart rate, detect the type of clothing they are wearing, determine what they are holding and the like and display information related to that collected information. For example, a woman holding a shopping bag from a shoe store may receive information about additional shoe shopping in the vicinity.

When a user selects one of the menu options, at least one of the sign arms will update its position and content in order to display information relevant to the selected option.

The system may connect to the internet via any methods known to those skilled in the art, such as, for example via Wi-Fi, wired Ethernet, cellular network, and/or fiber optic network. The interface may provide the internet connection.

The smart sign may further comprise a computer (the interface computer) which may be operatively coupled to the interface, the smart sign and a back end system. The interface computer may be operatively coupled to the sign arms and sign faces via any method known to those skilled in the art, as in, for example over a RS485 serial bus.

The interface computer serves as the communications port between the back end system and the sign arms and display faces. The interface computer may communicate in real time with the sign arms and sign faces as well as with the back end system. The interface computer may be coupled to a plurality of input sensors such as, for example, optical systems and climate sensors such as wind speed and temperature.

In some embodiments, the signs, systems, networks, and methods described herein include a customizable interface panel. Interface panel could be customized for each installation, and even removed if necessary. The panel can include a dynamic list of categories for local events and locations, as well as maps, and other relevant local information.

Figure 4:
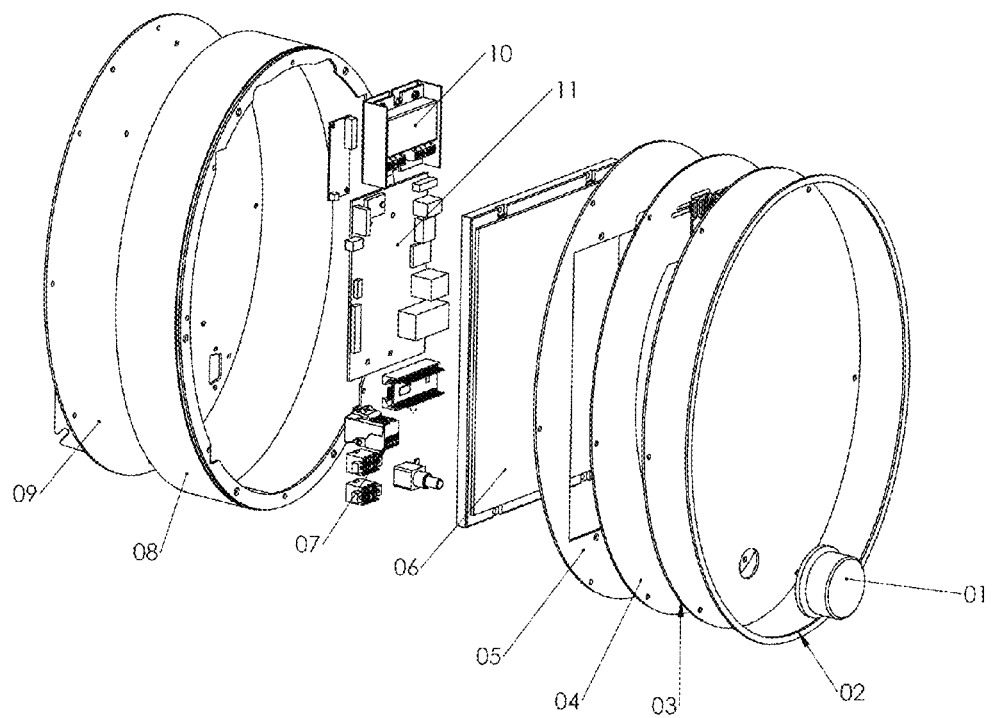
FIG. 4 shows a non-limiting example of an exploded structural diagram of a user interface panel.

Referring to FIG. 4, in a particular embodiment, a user interface panel comprises an oval shaped panel with LCD display for presenting a GUI. In this embodiment, the user interface panel includes an interface knob (twist to highlight; push to select) 1, a glass retainer 2, a transparent glass or plastic screen 3, a decorative mask 4, a display mounting plate 5, a LCD display 6, a communications and power input element 7, an outer rim 8, a back plate 9 for mounting the panel to the post, a DC-DC power supply 10, and an embedded computer 11.

Figure 5:
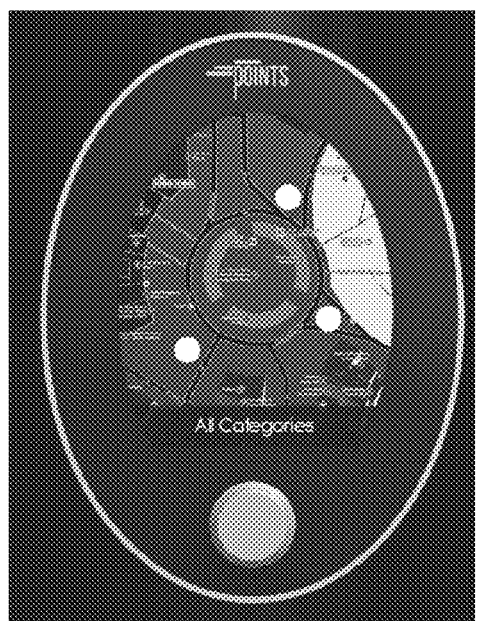
FIG. 5 shows non-limiting examples of a graphic user interface for a user interface panel described herein.
Figure 5:
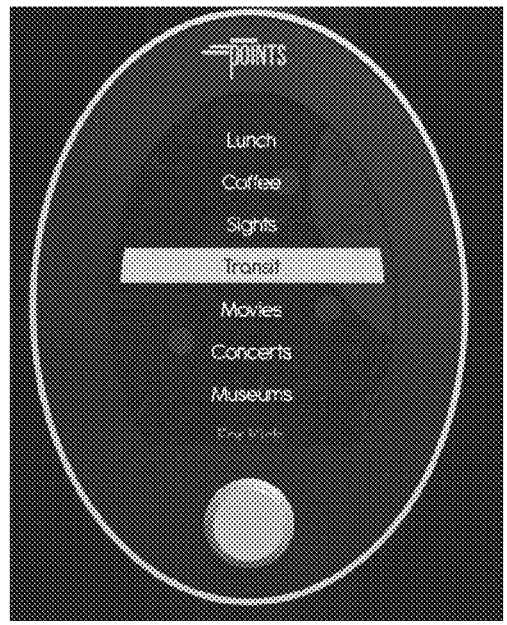
Figure 5:
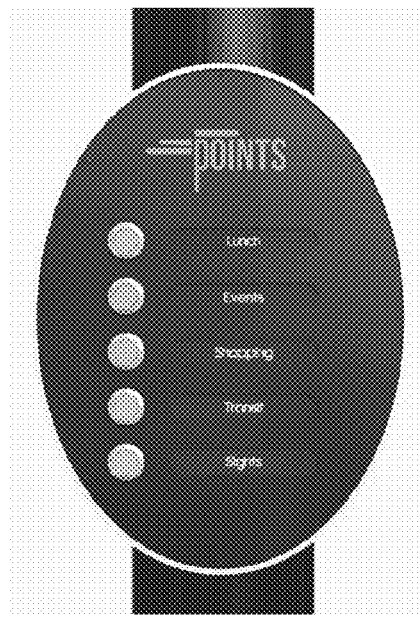

The interface panel is suitably implemented in a number of ways. For example, in some embodiments, the interface panel includes a digital display which presents a GUI. Referring to FIG. 5(a), in one embodiment, a suitable GUI includes a map of the area around the robotic sign which indicates points of interest. Referring to FIG. 5(b), in another embodiment, a suitable GUI includes a list of points of interest allowing a user to select a particular point of interest using, for example, a touchscreen or an interface knob. Referring to FIG. 5(c), in another embodiment, a suitable GUI includes buttons with a display associated with each, where the user use buttons to interact with the interface panel.

Figure 12:
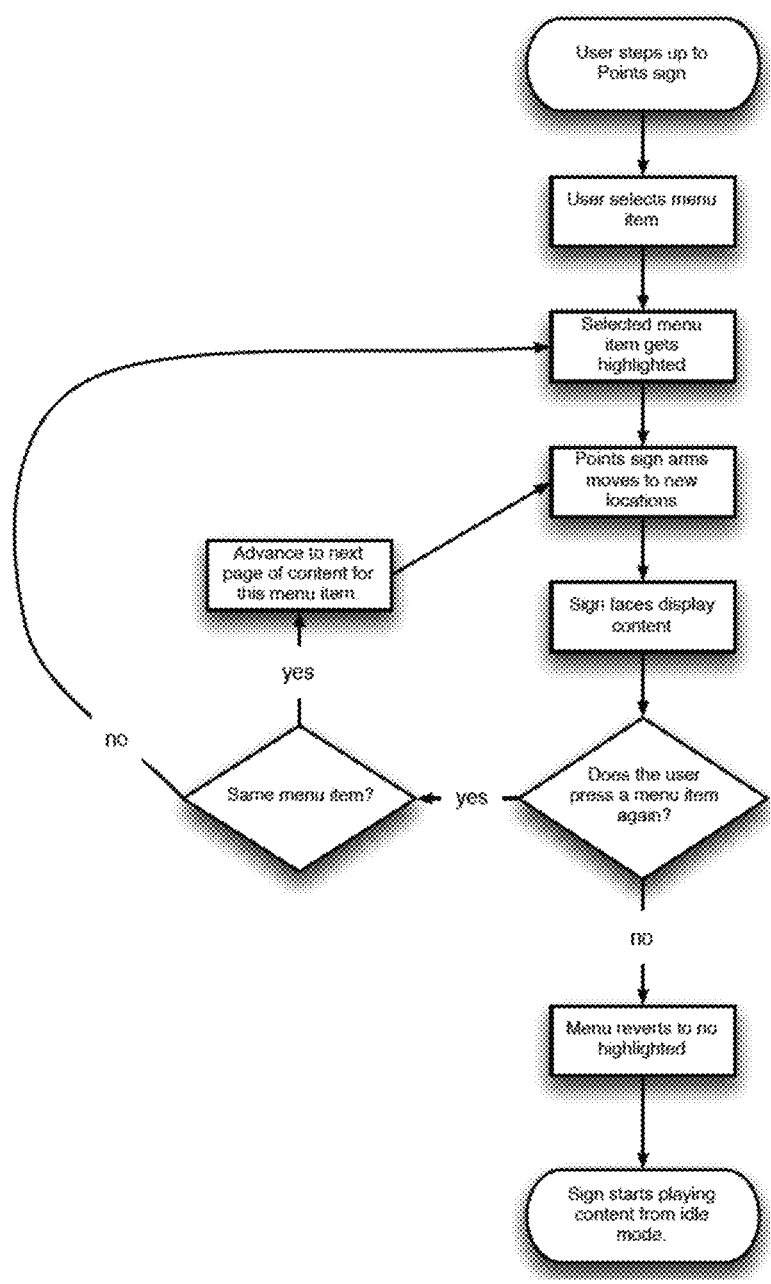
FIG. 12 shows a non-limiting example of a process flow; in this case, a process for a user to operate an interface panel.

FIG. 12 shows a non-limiting process flow for user interaction with a robotic sign described herein. Referring to FIG. 12, in a particular embodiment, a user approaches a robotic sign and interacts with an interface panel on the sign post to select a menu item from a list of menu items. The selected item is highlighted. In response to the user selection, the sign arms are rotated to point to a location associated with the selected item and a screen on the sign face displays content associated with the selected item. The user has the option to select another item. If the user does not select another item, the menu reverts to its original, non-highlighted, state and the sign resumes displaying content from an idle mode. If the user selects another menu item, the sign determines if the selected item is the same as the last selected item of if it is different.

Base

Figure 6:
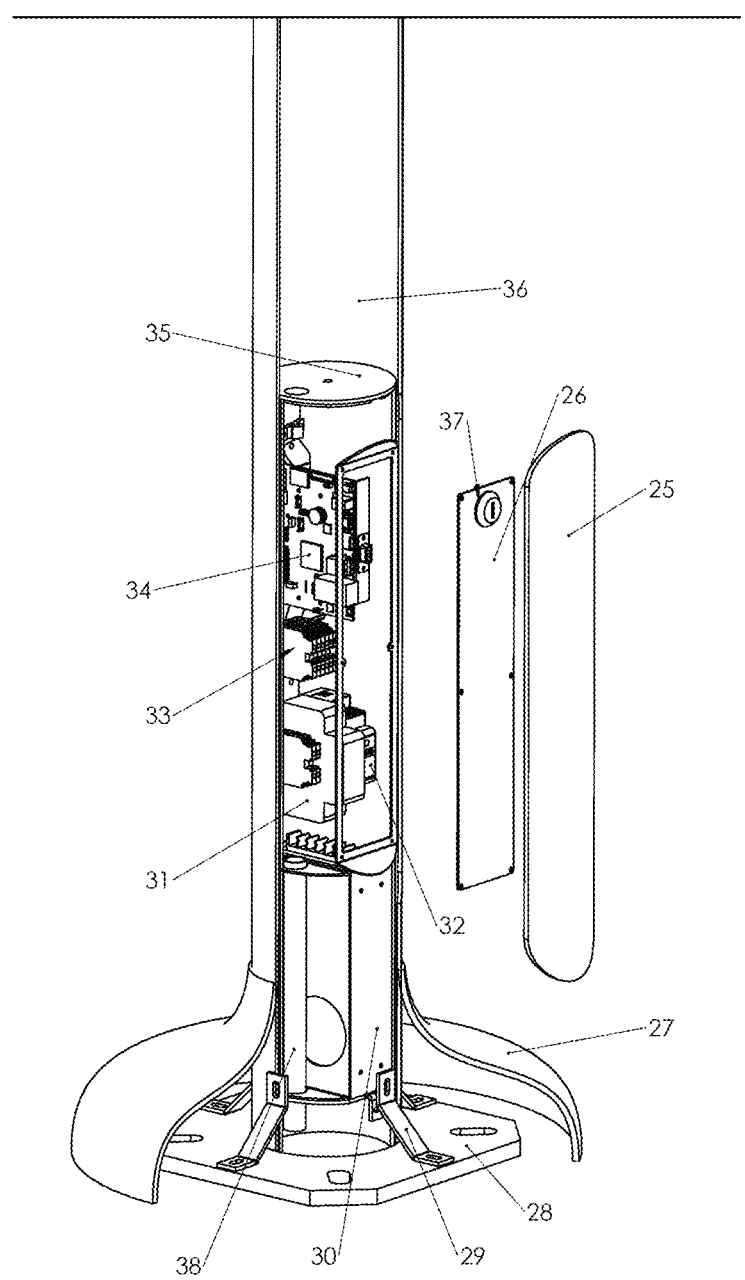
FIG. 6 shows a non-limiting example of a structural diagram of a robotic sign base described herein.

In some embodiments, the signs, systems, networks, and methods described herein include a base. Referring to FIG. 6, in a particular embodiment, the robotic sign includes a base at one end of an elongated sign post 36. In this embodiment, the base includes an ornamental base cover 27, a base/mounting plate 28, a support bracket 29, an AC/DC power supply 12 to 48V 30, an AC/DC power supply 5V 31, circuit breakers 32, a distribution block 33, an embedded computer 34, a computer chassis top cover with cable access panel 35, a computer chassis lock 37, and an input power line conduit 38.

Sensors

In some embodiments, the signs, systems, networks, and methods described herein include sensors. In some embodiments, sensors comprise cameras which are used for estimating traffic flow, security, testing, etc. In some embodiments, sensors comprise temperature, humidity, and/or wind speed/direction sensing. These sensors provide information on the environmental conditions of a sign, and allow it to protect itself in the event of overheating or becoming aerodynamic in high winds. In some embodiments, sensors comprise NFC/RF-ID to allow a person passing by to receive or push data. In further embodiments, the sensors are used for maintenance and testing. In some embodiments, a sensor comprises an ambient light sensor which is placed on an arm or sign post, allowing each sign arm to change its brightness. In some embodiments, the data collected from the sensors is licensed out to other parties.

Display Items

In some embodiments, the signs, systems, networks, and methods described herein include display items described by display item information. In further embodiments, each display item comprises a location and description. In still further embodiments, a display item is presented on a display on a rotating arm of a robotic sign, wherein the arm rotates to indicate the direction of the location and displays the description on a display screen associated with a face of the sign arm.

Many types of display items are suitable. In some embodiments, a display item comprises a distance from the sign to a point of interest (e.g., an event, a retail outlet, a monument, a facility, a person, etc.). In some embodiments, a display item comprises a graphic icon, a photo, an animated illustration, or a video to visually communicate information about the item. In some embodiments, a display item comprises information specific to a particular location such as a venue, a name, a location, a date, a time, a wait time, transit information, and public facility information. In some embodiments, a display item comprises information about a retail transaction such as a price, a discount, a coupon code, an offer, or an advertisement. In some embodiments, a display item comprises a news headline, a stock quote, a sports score, or a weather report. In some embodiments, a display item comprises social media information such as a review, a rating, a social post, a microblog post, media posted to a social photo-sharing service, or media posted to a social video-sharing service (e.g., YouTube, Vimeo, Instragram, etc.).

Installation

In some embodiments, the signs, systems, networks, and methods described herein include customized installation. The base bolt pattern for installation is optionally customized for any suitable installation standard. A non-limiting example includes a city lamp post being swapped out for a robotic sign described in the present disclosure. This requires no upgrade to the ground anchor neither would it necessitate laying new cables for power to the sign.

Sign Design

In some embodiments, the signs, systems, networks, and methods described herein include flexible or customizable sign design. The appearance of the sign, e.g., color and shape of the whole body or part of the body can be altered to match similar designed elements (non-limiting examples include street lamps, signs, traffic lights, buildings, banners, etc.) for a given location. All ornamental pieces are easily replaced.

In one embodiment, a robotic sign described herein is designed to replace an existing street lamp by using the same kind of mounting brackets and leveraging the power already provided to each street lamp location. In some embodiments, the finial at the top of the sign post is replaced by an ornamental lamp with an LED street lamp bulb that runs on DC power. In other various embodiments, a robotic sign described herein is adapted to hang from a ceiling or off a wall to be used in a wide variety of locations.

Administrative Platform/Application

In some embodiments, a back end subsystem is used as a central input and control mechanism for one or more robotic signs or network of signs. The back end subsystem is optionally used for storing location information and configuration settings for one or more signs. A user interface for the back end subsystem allows administrators with different privilege levels to create, remove, and otherwise edit the system's content and configuration(s). For example, administrators optionally enter the GPS coordinates of a sign's location and cause the system to auto-populate the database with data on the locations surrounding it.

For example, in some embodiments, the signs, systems, networks, and methods described herein include an administrative platform and/or application. In further embodiments, the administrative platform/application allows users to specify exactly when they want their content to be displayed, for how long, and on which poles/signs they'd like it to appear. In some embodiments, the administrative platform/application comprises a post-creation window allowing users to preview their posts to ensure they will fit and appear correctly. In some embodiments, the administrative platform/application comprises a calendar-based schedule of content configured to be displayed. In some embodiments, the administrative platform/application comprises an analytics display presenting information pertaining to previously displayed content and currently displayed content.

In some embodiments, an administrative application described herein is a web-application. In other embodiments, an administrative application described herein is a mobile application. In further embodiments, an administrative application is adapted for use by an administrative user, for example, a robotic sign owner or operator, a robotic sign network owner or operator, an robotic sign advertising network owner or operator, or a merchant/vendor/service provider granted authority to post content to one or more robotic signs.

Figure 7:
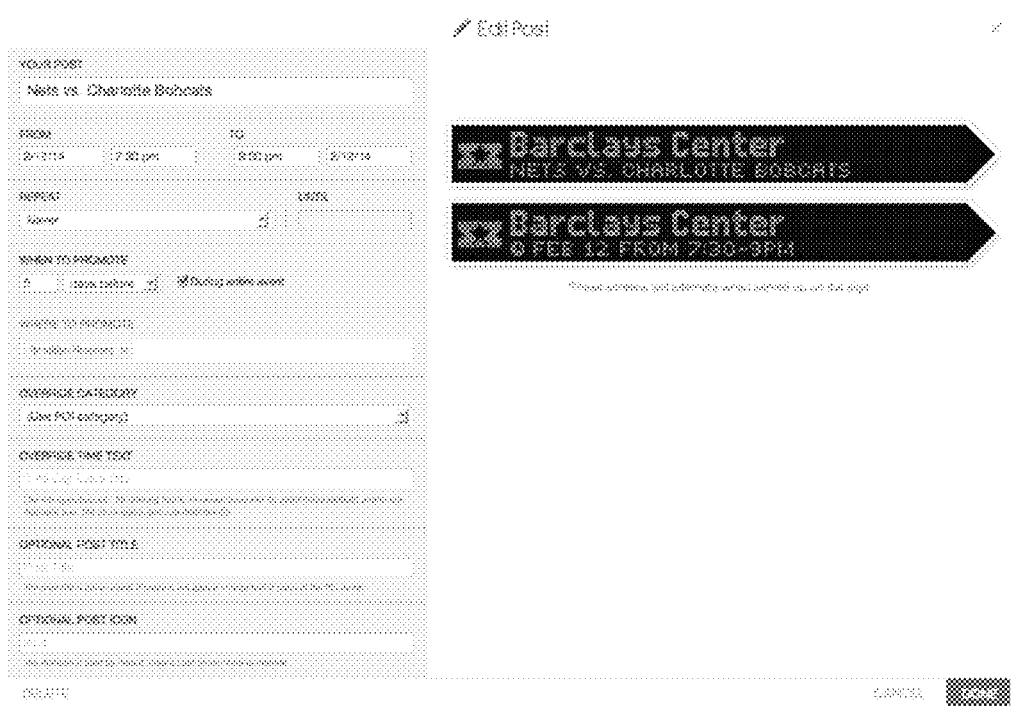
FIG. 7 shows a non-limiting example of an administrative user application described herein; in this case, an application including an interface allowing an administrative user to configure display items for one or more robotic signs.

Referring to FIG. 7, in a particular embodiment, the administrative platform/application allows an owner of a sign or an independent business to push content up to any sign they have been granted permission to post to. In this embodiment, the administrative platform/application includes an interface allowing an administrative user to configure a name, start date, start time, end date, end time, display repeat parameter, location, override category, overtime time text, optional title, and optional icon for each post. Further, in this embodiment, the administrative platform/application includes a real-time preview of what the configured post will look like on the sign display.

Figure 8:
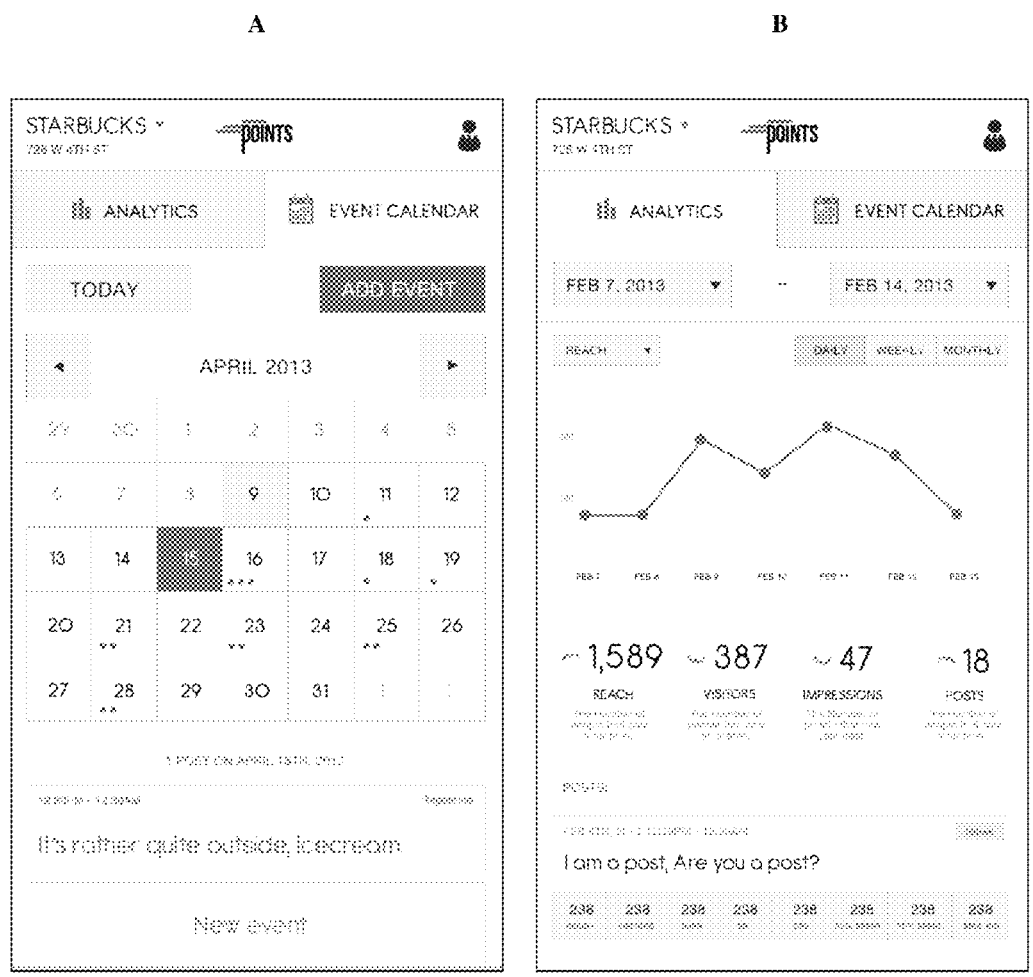
FIG. 8 shows non-limiting examples of an administrative user application described herein; in this case, an application including an interface allowing the administrative user to view a calendar-based schedule of display items and an interface presenting analytics data pertaining to the presentation of the display items by one or more robotic signs.

Referring to FIG. 8A, in a particular embodiment, the administrative platform/application includes a schedule of posts including past and present posts for one or more robotic signs as well as posts planned for the future. In this embodiment, the schedule is in form of a calendar. In further embodiments, the platform is optionally connected to any application programming interface (API) to automatically populate a calendar with content.

The back end subsystem also optionally gathers statistical data from the signs associated with it. The collected data suitably include any data streams identified by administrators, as in, for example user interactions and sensory data collection. By incorporating data collection streams from associated sensors, the system optionally collect data about how many users walk past the smart sign, or stop in its vicinity. As another example, the system optionally collects metrics about what information users are requesting as a function of location, time of day, time of year, and the like.

Referring to FIG. 8B, in a particular embodiment, the administrative platform/application includes an analytics section allowing user to view: how many people have been in viewing range of a particular sign, how many times a specific post has been displayed, and how many total posts have been displayed. In this embodiment, analytics data is viewable for a specified time period including, by way of examples, daily, weekly, and monthly.

Figure 11:
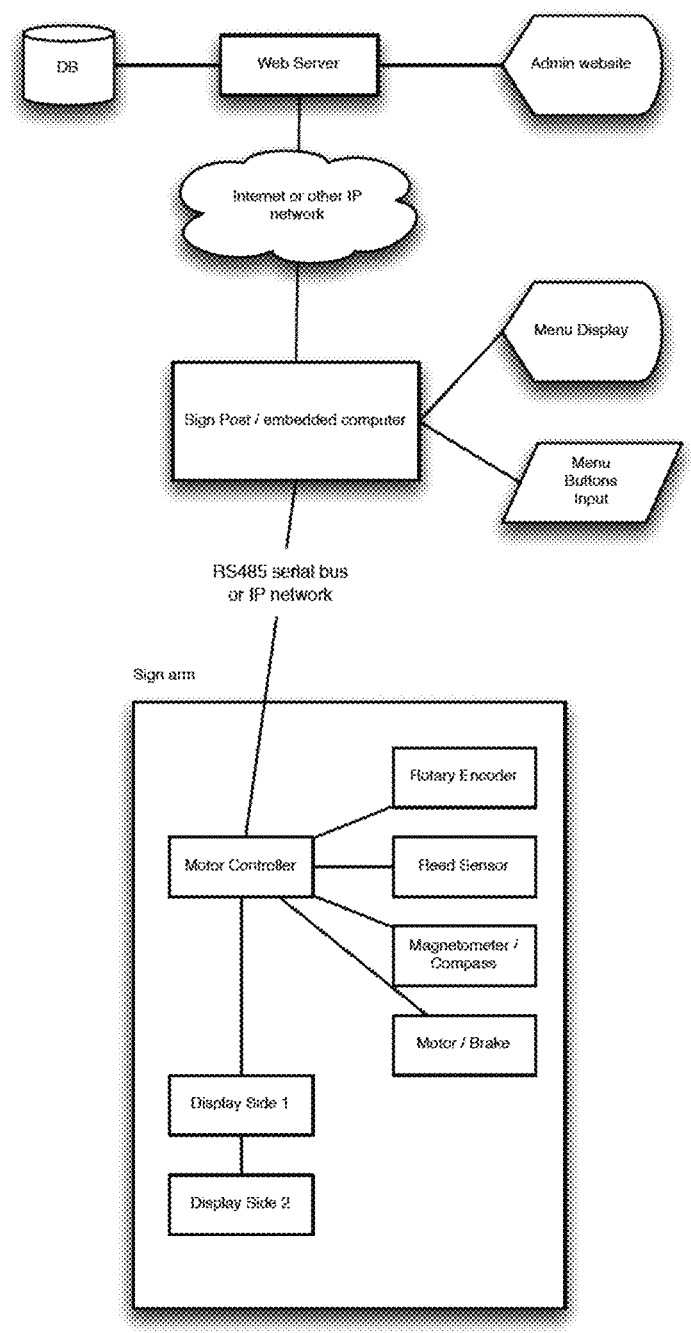
FIG. 11 shows a non-limiting example of a system diagram for a robotic sign system described herein.

FIG. 11 illustrates an example system. Referring to FIG. 11, in a particular embodiment, a web server in communication with a database presents an administrative website, which is connected by the Internet or some other IP network to the embedded computer of a robotic sign. In this embodiment, the robotic sign includes a user interface offering a menu display and one or more user input elements. The embedded computer of the sign is further connected, via a RS485 serial bus or IP network to a sign arm. Further, in this embodiment, the sign arm includes two display surfaces and a motor controller comprising a rotary encoder, a reed sensor, a magnetometer/compass, and a motor/brake.

Apps

In some embodiments, each smart sign system is optionally configured via a back end subsystem to run any number of apps. Once a user selects an option on the interface panel, the corresponding app runs on the interface computer. The apps may run as standalone programs that use sensory data and custom business logic locally to render updates to the user interface, sign faces, and rotational position of the sign arms (i.e., different angles or pointing at various geographical locations, etc.).

In further embodiments, apps may also interface with the back end subsystem to get data or configuration settings from a database or other available information stream. By way of example, the system could pull data from social networking services, microblogging services, social discovery services, news feeds, sports feeds, weather services, and the like.

Public Application

In some embodiments, the signs, systems, networks, and methods described herein include a public, consumer application. In further embodiments, the public, consumer application allows users to view all recent posts from particular robotic signs, to view a history of the sign content they have viewed, and in appropriate conditions, post content to one or more signs. In some embodiments, a public, consumer application described herein is a web-application. In other embodiments, a public, consumer application described herein is a mobile application. In further embodiments, a public, consumer application is adapted for use by a content consuming end user.

Figure 10:
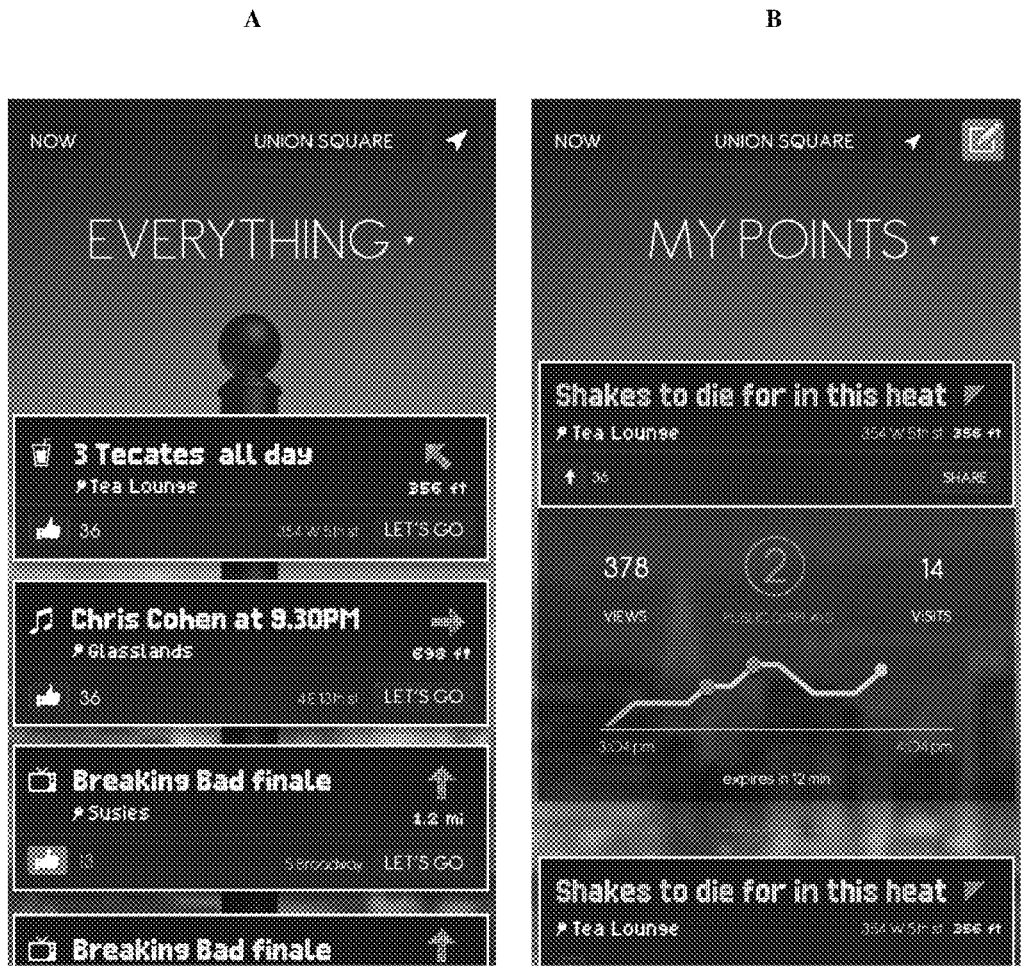
FIG. 10 shows non-limiting examples of a graphic user interface for a public mobile application described herein.

Referring to FIG. 10A, in a particular embodiment, a public, consumer application includes an interface for viewing the content being posted to the robotic signs, platforms, and networks. In this embodiment, a list of posted content is optionally sorted by type of post and/or recency of post.

Referring to FIG. 10B, in a particular embodiment, a public, consumer application includes an interface for posting content to one or more signs. In this embodiment, appropriate and useful public posts would be pushed to physical robotic signs. Further, in this embodiment, analytics are provided for user-posted content including, for example, views and visits.

A mobile consumer app is optionally connected to Wi-Fi and Bluetooth tracking and optionally leverages a mobile device's GPS positioning data to serve up the most appropriate content to a particular content consuming end user.

In some embodiments, a mobile consumer app uses sound cues to alert consumers to the availability of new sign content (e.g., recently posted display items) or nearby robotic signs.

Tracking and Device Sniffing

In some embodiments, the signs, systems, networks, and methods described herein include a communication element. In various embodiments, the communication module is wireless, wired, or a combination of wireless and wired. In some embodiments, a robotic sign scans for Wi-Fi and/or Bluetooth devices, such as mobile phones, to estimate how many people are around a given robotic sign at any given moment. In other embodiments, a camera is provides images to which a facial recognition algorithm is applied. In further embodiments, individual people around a sign are identified.

In some embodiments, the signs, systems, networks, and methods described herein are part of an advertising platform. By using Wi-Fi sniffing/tracking the systems are able to estimate traffic and place a value on a given post. In further embodiments, advertisers optionally participate in a real-time exchange bidding system to bid on sign-based ads in accordance with the value of the given audience. In some embodiments, acquired traffic data is licensed to third parties.

Figure 9:
FIG. 9 shows non-limiting examples of a robotic sign described herein integrated into an advertising platform.
Figure 9:

Referring to FIGS. 9A and 9B, in some embodiments, the signs, systems, networks, and methods described herein include an advertisement platform. In these embodiments, the robotic signs use one or more sign arm displays to advertise, for example, events, products, services, and specials/offers. In this mode a sign post can be monetized where business owners/users pay to have their posts go up more often and get in front of more eyeballs.

In some embodiments, a stand-along hockey-puck sized device, which is coupled to a sign post, is given to a business user to install in its location. This device alone can scan for nearby events/traffics/mobile phones in the same way. When combined with the signs, the device can track various objects, e.g., people, events, vehicles, mobile computing devices, terrorists, advertisers, and potential customers. When a mobile device has been identified near a sign post with a specific message, the systems, devices, apparatus, platforms, and media described herein can identify if the mobile device user is within an advertised neighborhood.

In some embodiments, a sign post is installed in an attraction, allowing the sign post to identify who is near a given sign, what schedule they are on, where they have been, and adjust the displayed contents appropriately.

In some embodiments, a display item includes non-advertising content, e.g., a city wants to track (and influence) which of 3 paths people take to get from A to B where there are robotic signs along each path that can detect and redirect people.

In some embodiments, the signs, systems, networks, and methods described herein include a software application installed on a mobile device. The software application is coupled with sign post to allow a mobile user to be tracked by sign post and provided with appropriate information/contents.

In some embodiments, the signs and other associated devices are used to provide paid or free internet connectivity to the public as well as the businesses.

Licensing Content to Other Screens

In some embodiments, the signs, systems, networks, and methods described herein include a database of content. Other indoor and outdoor signage companies optionally purchase license keys to display local content from the database.

In an embodiment, a station installs dozens of dynamic screens which leverage local business content that is posted to the robotic sign platform.

Locations to Install Sign Posts

In some embodiments, the signs, systems, networks, and methods described herein include a location to install the robotic sign. Suitable examples include cities, university campuses, amusement parks, conferences, hotels, casinos, Olympic, and sport games. In certain embodiments, the robotic signs are installed throughout a city to allow local businesses to push content to, as well as leverage them to push public/city information including emergency alerts, such as weather, amber, transit, city bikes, banks, restaurants, stores, shopping centers, museums, buildings, etc. In various embodiments, like amusement parks, the robotic signs are installed to display ride/show wait times, direct traffic flow when certain pathways get congested, highlight bathrooms and other services. In certain embodiments, like conferences, casinos, and/or hotels, the robotic signs are used to display upcoming talks/events, direct people in the appropriate direction, highlight bathrooms and other services. In some embodiments, such sports events or Olympic events, the robotic signs are used to display real-time scores/matches/event info while pointing people in the appropriate directions.

In some embodiments, the sign posts are coupled to social network media sources from, for example, Google, Facebook, Twitter, Foursquare, Yelp, Seamless, etc.

Digital Processing Device

In some embodiments, the signs, systems, networks, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the signs, systems, networks, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the signs, systems, networks, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the signs, systems, networks, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the signs, systems, networks, and methods disclosed herein include one or more databases, or use of the same. In view of the disclosure provided herein, those of skill in the art will recognize that many databases are suitable for storage and retrieval of sign configuration, user, and advertising information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1

Single Sign at a Multi-Day Festival

The smart sign system is brought to and assembled at a public gathering such as a multi-day festival. The back end subsystem includes a database which is populated with data provided by the organizers of the festival, as in, for example, food vendors and their locations, live performances and their locations and times, exhibitor displays and their locations, transportation locations, and any other relevant information entered as a function of location and/or time.

The smart sign system's user interface is configured to reflect the information in the database, as in, for example, providing user selectable options for food vendors, live performances, exhibitor displays, and transportation options. A user may approach the smart sign and input the desired query, as in, for example, by pressing a button associated with food vendors. Based on the time (date and time) the sign arms will rotate to point in the direction of various food vendors and display information relevant to those vendors, as in, for example the distance to the vendor, type of food, specials, coupons or the like. The same process could be repeated with another option, for example, transportation, at which point the sign arms would rotate again to point in the direction of various transportation options such as cab stands or train stations, and the sign face would display the relevant information, such as when the next train/bus/shuttle is leaving or the like.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A robotic sign comprising:
   a. a sign post;
   b. an arm movably attached to the sign post, the arm having a positioning apparatus configured to allow the arm to rotate independently and contiguously around the sign post, the arm having at least one face comprising an electronic display configured to present display items; and
   c. a communication element configured to receive display item information from a remote administration application, the display item information comprising a direction and a description;
   wherein upon presenting a display item, an arm rotates to indicate the direction and displays the description.

2. The sign of claim 1, wherein the sign post is a vertical post for mounting on a horizontal surface.

3. The sign of claim 1, wherein the sign post is a horizontal post for mounting on a vertical surface.

4. The sign of claim 1, wherein the display is a color display.

5. The sign of claim 1, wherein the display is selected from: a matrix of light emitting diodes, a light emitting diode backlit thin-film transistor display, a liquid crystal display, a organic light-emitting diode display, an active matrix organic light emitting diode display, and a combination thereof.

6. The sign of claim 1, comprising 1-10 arms.

7. The sign of claim 6, comprising 3 arms.

8. The sign of claim 1, wherein the arm is reversibly attached to the sign post.

9. The sign of claim 1, wherein the arm has a brake apparatus configured to arrest rotation of the arm.

10. The sign of claim 1, wherein the positioning apparatus comprises: a stepper motor, a brushed or brushless AC or DC motor, or an AC induction motor.

11. The sign of claim 1, wherein the display item information further comprises one or more of: a distance, a location, a graphic icon, and an animation.

12. The sign of claim 1, wherein the description comprises one or more of: a venue, a name, a location, a date, a time, a wait time, transit information, and public facility information.

13. The sign of claim 1, wherein the description comprises one or more of: a price, a discount, a coupon code, an offer, and an advertisement.

14. The sign of claim 1, wherein the description comprises one or more of: a news headline, a stock quote, a sports score, a weather report, a review, a rating, a social media post, a microblog post, media posted to a social photo-sharing service, and media posted to a social video-sharing service.

15. The sign of claim 1, wherein the direction comprises one or more rotational movements.

16. The sign of claim 1, further comprising a consumer user interface panel configured to allow selection of display items.

17. The sign of claim 1, further comprising an environmental sensor.

18. The sign of claim 17, wherein the environmental sensor is selected from: a camera, a temperature sensor, a humidity sensor, a wind speed sensor, a wind direction sensor, an ambient light sensor, and a combination thereof.

19. The sign of claim 1, wherein the communication element is a wireless communication element.

20. The sign of claim 1, wherein the communication element is further configured to receive display item information from a consumer mobile application.

21. The sign of claim 1, further comprising an imaging element to uniquely identify consumers near the sign based on captured images.

22. The sign of claim 1, further comprising a wireless communication element to uniquely identify consumers near the sign based on unique wireless signals from devices associated with the consumers.

23. The sign of claim 22, wherein the display is changed in response to identification of a consumer near the sign.

24. A robotic sign network comprising a plurality of robotic signs, wherein each sign comprises:
   a. a sign post;
   b. an arm movably attached to the sign post, the arm having a positioning apparatus configured to allow the arm to rotate independently and contiguously around the sign post, the arm having at least one face comprising an electronic display configured to present display items; and
   c. a wireless communication element configured to receive display item information from a remote administration application, the display item information comprising a direction and a description;
   wherein upon presenting a display item, the arm rotates to indicate the direction or the location of another robotic sign in the network and displays the description.

25. A computer-implemented system comprising:
   a. a digital processing device comprising an operating system configured to perform executable instructions and a memory;
   b. a computer program including instructions executable by the digital processing device to create an administrative application comprising:
      i. a software module configured to present an interface allowing an administrative user to configure display items for one or more robotic signs, each display item comprising a location and description; wherein each display item is presented on a display on a rotating arm of a robotic sign, the arm rotating to indicate the direction of the location and displaying the description;
      ii. a software module configured to present an interface allowing the administrative user to view a calendar-based schedule of display items; and
      iii. a software module configured to present analytics data pertaining to the presentation of the display items by the one or more robotic signs.

26. The system of claim 25, wherein the display item further comprises one or more of: a distance, a graphic icon, and an animation, a venue, a name, a location, a date, a time, a wait time, transit information, public facility information, a price, a discount, a coupon code, an offer, an advertisement, a news headline, a stock quote, a sports score, a weather report, a review, a rating, a social media post, a microblog post, media posted to a social photo-sharing service, and media posted to a social video-sharing service.

27. The system of claim 25, wherein the software module configured to present an interface allowing an administrative user to configure display items provides a preview of the display item presented on a robotic sign.

28. An advertising system comprising:
   a. a robotic sign comprising: a sign post; an arm movably attached to the sign post, the arm having a positioning apparatus configured to allow the arm to rotate independently and contiguously around the sign post, the arm having at least one face comprising an electronic display configured to present display items; and a wireless communication element configured to: detect a unique wireless signal from a device associated with a consumer near the sign; and receive display item information from a remote administration application, the display item information comprising: a location and an advertisement; wherein upon presenting a display item, an arm rotates to indicate the direction of the location and displays the advertisement;
   b. a digital processing device provided with instructions executable by the digital processing device to create an administrative application comprising: a software module configured to present an interface allowing an administrative user to remotely configure display items for the robotic sign; and a software module configured to present analytics data pertaining to the presentation of the display items by the robotic sign and consumer conversion data; and
   c. a conversion tracking device located near the subject of the advertisement at the location, the device configured to detect the unique wireless signal and report consumer conversion information to the administrative application.

29. The system of claim 28, comprising a plurality of robotic signs and a plurality of conversion tracking devices.

30. An system comprising:
   a. a robotic sign comprising: a sign post; an arm movably attached to the sign post, the arm having a positioning apparatus configured to allow the arm to rotate independently and contiguously around the sign post, the arm having at least one face comprising an electronic display configured to present display items; and a wireless communication element configured to: detect a unique wireless signal from a device associated with a consumer near the sign; and receive display item information from a remote administration application, the display item information comprising: a location and a description; wherein upon presenting a display item, an arm rotates to indicate the direction of the location and displays the description;
   b. a digital processing device provided with instructions executable by the digital processing device to create an administrative application comprising: a software module configured to present an interface allowing an administrative user to remotely configure display items for the robotic sign; and a software module configured to present analytics data pertaining to the presentation of the display items by the robotic sign and consumer tracking data; and
   c. a tracking device located near the subject of the advertisement at the location, the device configured to uniquely identify consumers and report consumer tracking information to the administrative application.

31. The system of claim 30, comprising a plurality of robotic signs and a plurality of tracking devices.

* * * * *